(12) United States Patent
Wang et al.

(10) Patent No.: US 10,012,563 B1
(45) Date of Patent: Jul. 3, 2018

(54) POLARITY TEST OF FIBER ARRAYS BASED ON ELECTRONICALLY SWITCHED OPTICAL SIGNALS

(75) Inventors: Xinzhong Wang, Fremont, CA (US); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 303 days.

(21) Appl. No.: 13/552,557

(22) Filed: Jul. 18, 2012

(51) Int. Cl.
*G02B 6/04* (2006.01)
*G01M 11/00* (2006.01)
*G02B 6/42* (2006.01)

(52) U.S. Cl.
CPC ........ *G01M 11/3136* (2013.01); *G01M 11/33* (2013.01); *G02B 6/4249* (2013.01); *G02B 6/4292* (2013.01)

(58) Field of Classification Search
CPC . G01M 11/33; G01M 11/3136; G02B 6/4249; G02B 6/4292
USPC ........................................................ 356/73.1
See application file for complete search history.

(56) References Cited

U.S. PATENT DOCUMENTS

| | | | | |
|---|---|---|---|---|
| 2,366,789 | A * | 1/1945 | Horham ........................ | 324/522 |
| 5,027,074 | A * | 6/1991 | Haferstat ...................... | 324/539 |
| 5,844,702 | A * | 12/1998 | Yarkosky et al. ............. | 398/139 |
| 5,966,225 | A * | 10/1999 | Taglione et al. .............. | 398/96 |
| 8,208,134 | B1 * | 6/2012 | Gunal ........................... | 356/73.1 |
| 8,488,244 | B1 * | 7/2013 | Li et al. ....................... | 359/618 |
| 2002/0149821 | A1 * | 10/2002 | Aronson et al. .............. | 359/152 |
| 2004/0156598 | A1 * | 8/2004 | Shih ...................... | G02B 6/4201 385/92 |
| 2005/0078916 | A1 * | 4/2005 | Hosking ................. | H04B 10/40 385/88 |
| 2006/0209290 | A1 * | 9/2006 | Suzuki et al. ................ | 356/73.1 |
| 2009/0154493 | A1 * | 6/2009 | Hinderthuer ....... | H04Q 11/0005 370/466 |
| 2009/0285520 | A1 * | 11/2009 | Kaplan ................. | G01M 11/083 385/12 |
| 2010/0026992 | A1 * | 2/2010 | Rosiewicz ......... | G01M 11/3127 356/73.1 |
| 2011/0085158 | A1 * | 4/2011 | Motter ................... | G01M 11/30 356/73.1 |
| 2011/0153544 | A1 * | 6/2011 | Nagel et al. ..................... | 706/54 |
| 2011/0206382 | A1 * | 8/2011 | Elselt ................. | H04B 10/2507 398/159 |

(Continued)

FOREIGN PATENT DOCUMENTS

DE        3812143 A1 * 10/1989    ............... G02B 6/04

OTHER PUBLICATIONS

"Small Form-factor Pluggable (SFP) Transceiver MultiSource Agreement (MSA)" Sep. 14, 2000.*

*Primary Examiner* — Dominic J Bologna
(74) *Attorney, Agent, or Firm* — Robert L. Branham

(57) ABSTRACT

A design of optical testing device or system for fiber arrays is disclosed. According to one aspect of the invention, an array of light sources and an array of detectors are disclosed. One of the light sources is controlled to be turned on to test a designated fiber in an array of fibers being tested for connection issues. A microcontroller is configured to determine which one of the detectors is detecting a light beam from one of the light sources, and mark a channel of the array of fibers accordingly depending on if the one of the detectors is supposed to detect the light beam; if another one of the detectors detects the light beam; or if none of the detectors detects the light beam.

11 Claims, 7 Drawing Sheets

(56) References Cited

U.S. PATENT DOCUMENTS

2013/0021597 A1* 1/2013 Carlson et al. ............. 356/73.1

* cited by examiner (a) N:N fiber array with correct connection (b) N:N fiber array with broken and wrong connection

POLARITY TEST OF FIBER ARRAYS BASED ON ELECTRONICALLY SWITCHED OPTICAL SIGNALS

BACKGROUND OF THE INVENTION

Field of the Invention

The invention is generally related to the area of optical communications. In particular, the invention is related to polarity test of fiber arrays based on electronically switched optical signals.

The Background of Related Art

With advanced development of fiber optical communication technologies, more and more applications of fiber arrays for parallel communications and interconnects are being explored. Vertical Cavity Surface Emitting Lasers (VCSEL) are commonly used in laser arrays in 1D or 2D. The current technologies can allow each such laser to be modulated to carry >10 Gbps data so that an aggregate of >100 Gbps can be transmitted by 10 such lasers in a linear array. At the same time, fiber connectors are making technological breakthroughs that allow many fibers to be ribonized and to be interfaced through a common connector. One typical such connector technology is called MPO connector and it allows 12 such fibers to be packaged with 250 um spacing between any two adjacent ones in 1D array. In recent years, MPO connector has also shown that they can be made into 2D arrays of 12×6 carrying as many as 72 fibers in parallel.

As VCSEL and ribbon fiber-based parallel communications become increasingly the dominant low cost solution for high speed short-reach data links, assembly processes are meeting challenges. Human errors do occur in assembling or manufacturing arrays of fibers. Once errors happen, the methods of identifying these mistakes (e.g., polarity error) are often time consuming. Auto-test solutions are demanded for many fiber ribbon polarity check applications.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

A design of optical testing device or system for fiber arrays is disclosed. According to one aspect of the invention, an array of light sources and an array of detectors are disclosed. One of the light sources is controlled to be turned on to test a designated fiber in an array of fibers being tested for connection issues. A microcontroller is configured to determine which one of the detectors is detecting a light beam from one of the light sources, and mark a channel of the array of fibers accordingly depending on if the one of the detectors is supposed to detect the light beam; if another one of the detectors detects the light beam; or if none of the detectors detects the light beam.

Depending on implementation, one or more optical transceivers are used to facilitate the implementation of the test system. The optical transceivers may be used to couple a light beam to a designated fiber and facilitate the detection thereof with a photodetector. In another embodiment, the optical transceivers include light sources and detectors, in which case these transceivers may be controlled by a microcontroller to facilitate the testing of fiber arrays.

The present invention may be implemented as a method, an apparatus or a part of a system. According to one embodiment, the present invention is an optical testing device comprising: an array of light sources, one of the light sources being turned on to test a designated fiber in an array of fibers being tested for connection issues; an array of detectors; a microcontroller configured to determine which one of the detectors is detecting a light beam from the one of the light sources, and mark a channel of the array of fibers accordingly depending on: if the one of the detectors is supposed to detect the light beam; if another one of the detectors detects the light beam; or if none of the detectors detects the light beam.

One of the objects, features, and advantages in the present invention is to provide an auto-test device or system for many fiber ribbon polarity check applications.

Other many objects, features, and advantages in the present invention become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1A is a device with correct connecting order while FIG. 1b is the same array with a broken and wrong polarity order;

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-7. However, those skilled in the art will readily appreciate that the detailed description given herein with respect to these figures is for explanatory purposes as the invention extends beyond these limited embodiments.

Figure 1:
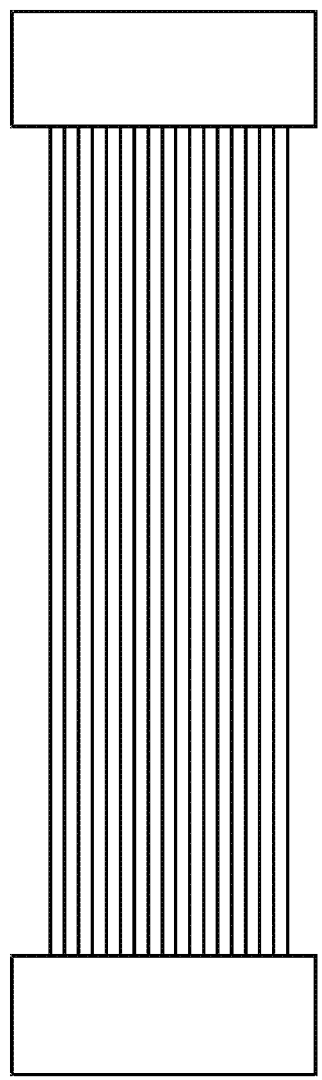
FIG. 1 shows a simple N input to N output fiber array (or ribbon) connector or jumper, where
Figure 1:
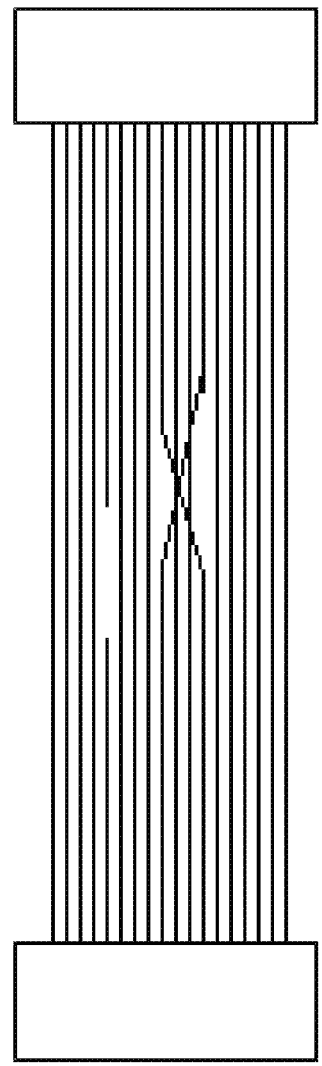
Figure 2:
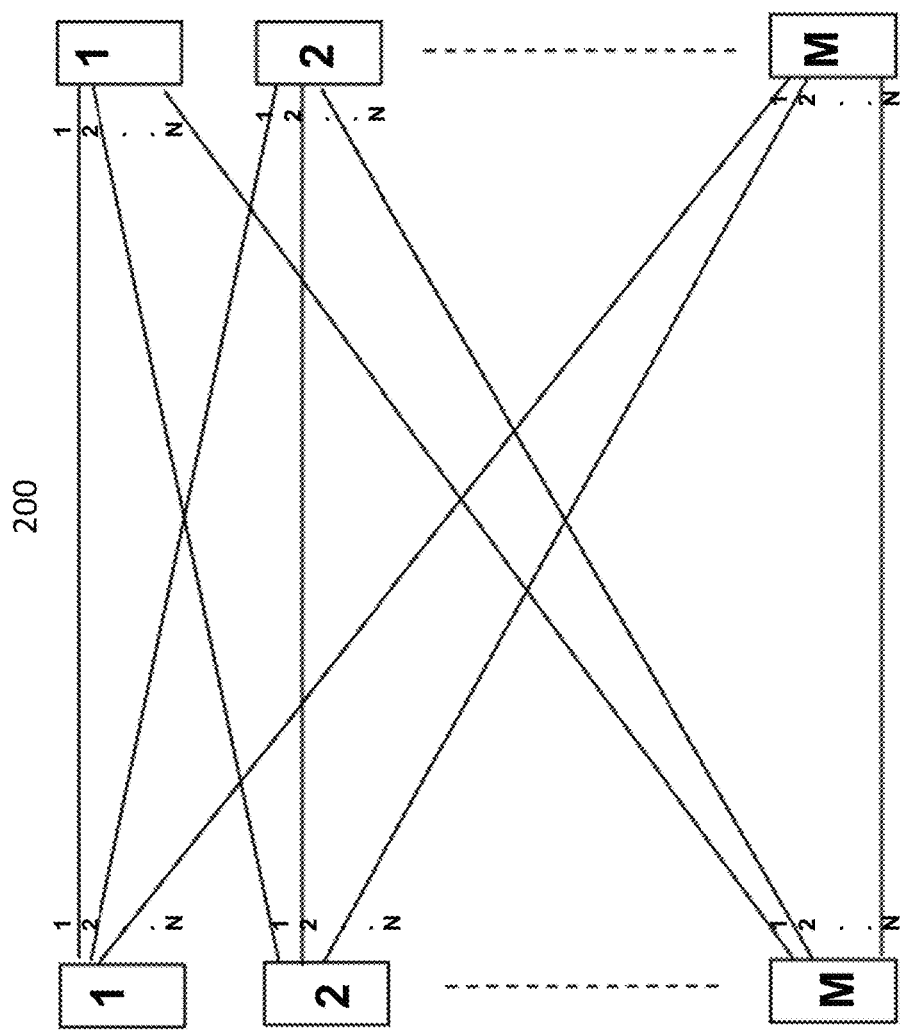
FIG. 2 illustrates an M×N fiber array unit. It may be perceived that it is very time consuming if the test of the fiber connection polarity is done manually.

Referring now to the drawings, in which like numerals refer to like parts throughout the several views. Fiber arrays are products consuming extended labor-intensive manufacturing processes, operators or assembling workers may make mistakes when wiring the fibers, thus fast test to check their orders are needed. FIG. 1 shows a simple N input to N output fiber array (or ribbon) connector or jumper, where FIG. 1A is a device with correct connecting order while FIG. 1b is the same array with a broken and wrong polarity order. There are many other applications that demand non-straightforward fiber connections among input and output MPO connector ports, FIG. 2 illustrates an M×N fiber array unit. It may be perceived that it is very time consuming if the test of the fiber connection polarity is done manually.

Figure 3:
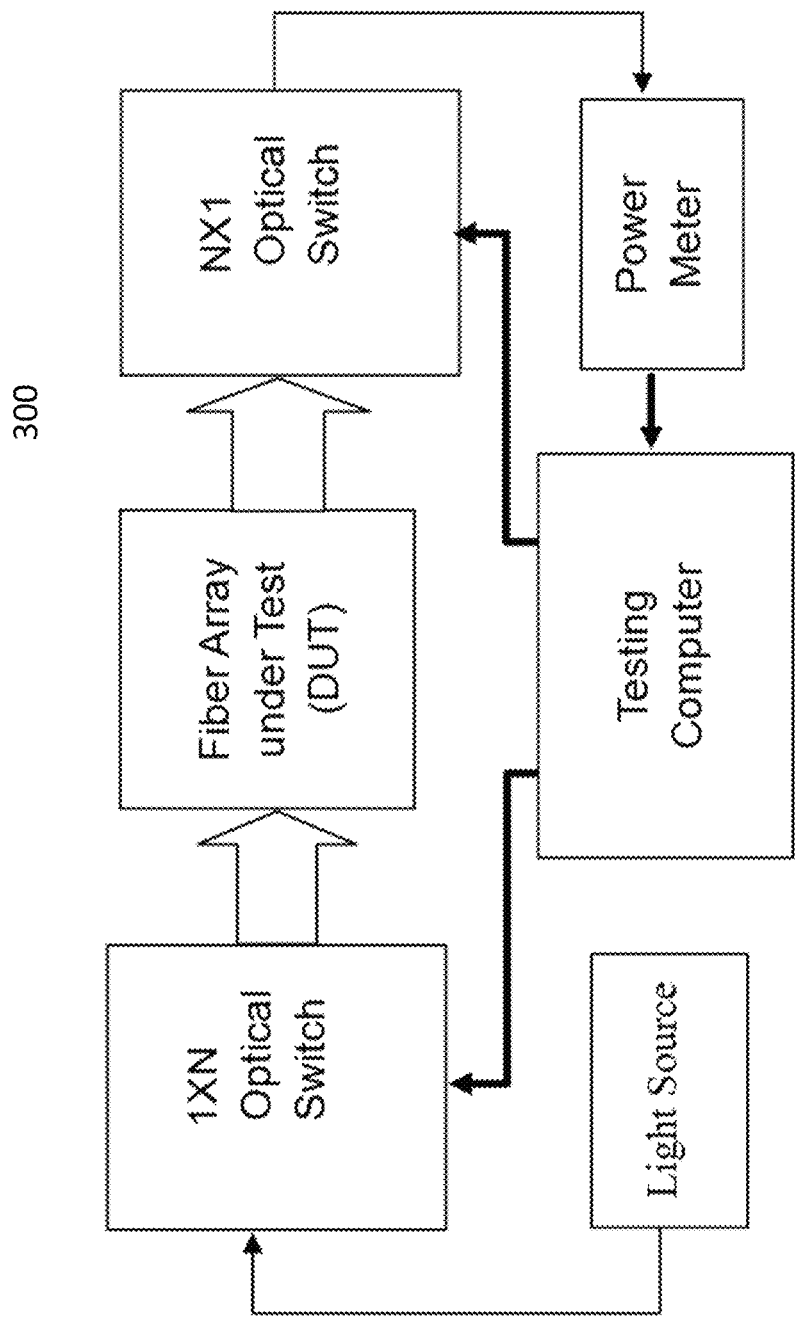
FIG. 3 shows a typical solution or a prior art to demonstrate how to conduct a fiber array polarity check of N fibers.

FIG. 3 shows a typical solution or a prior art to demonstrate how to conduct a fiber array polarity check of N fibers. It is based on using an optical switch of 1×N to switch a light from a common source, and a N×1 optical switch to take the passing light signal from a channel of the N-channel fiber array being tested to a light detector. This solution works but it may not be a cost effective solution for some of the reasons as described in the next paragraph.

A) Using a waveguide switch or a free-space fiber switch, this solution may not be effective to handle both single-mode (SM) and multi-mode (MM) fiber arrays. Thus, one has to build either a solution SM or MM, separately. B) With the current technology to make 1×N port optical switches for either SM or MM fibers, the resultant system could be bulky and high cost. C) Large 1×N or N×1 optical switches tend to be mechanically activated and use moving parts, thus their speeds are typically slow and limits the testing speed.

Figure 4:
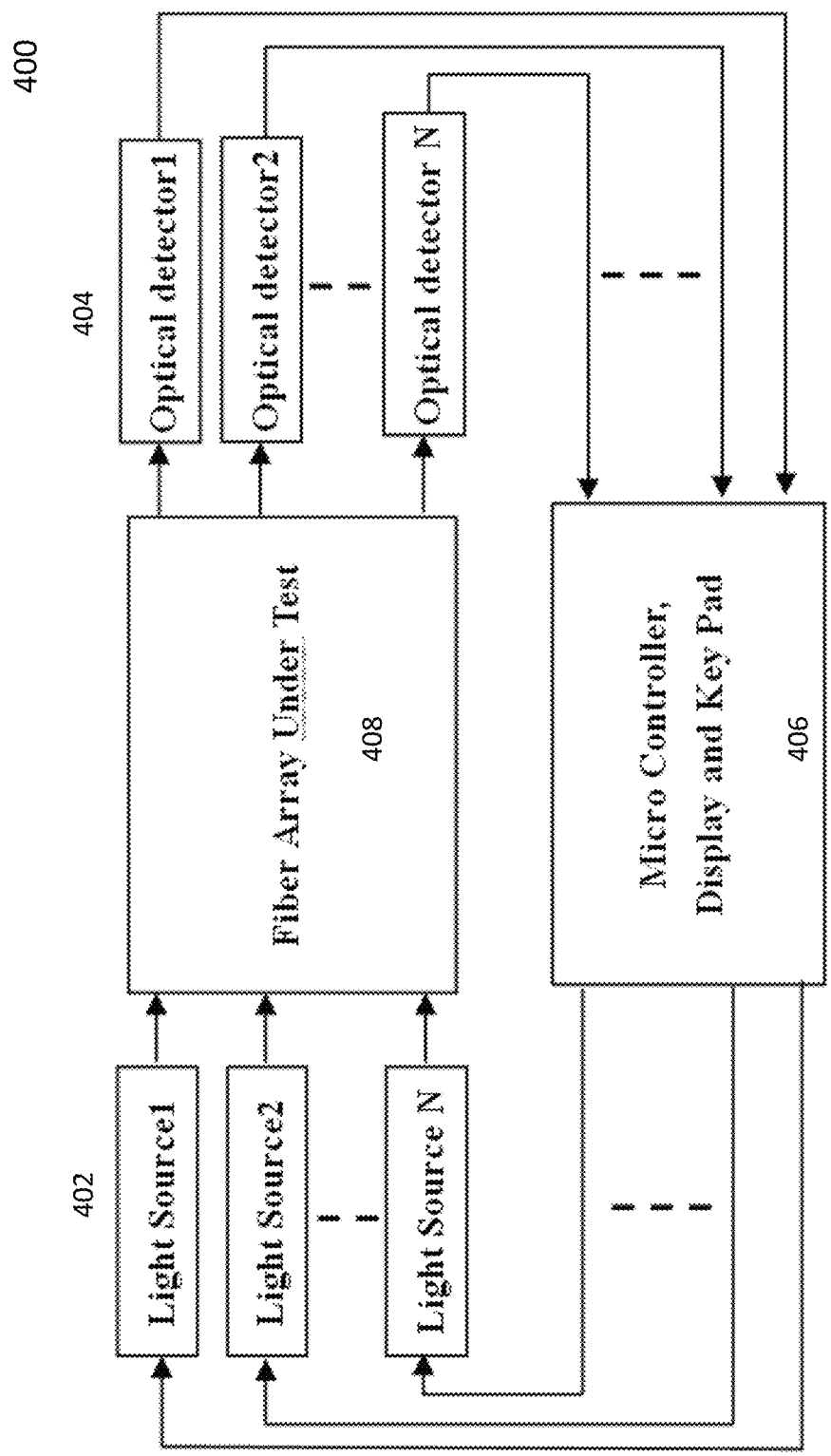
FIG. 4 shows a test system configuration according to one embodiment of the present invention.

In the current invention, a fiber array connectivity (polarity) test system is disclosed. FIG. 4 shows a test system 400 configuration according to one embodiment of the present invention. This test system 400 utilizes electronic switching of multiple light sources 402, a light detector arrays 404, all controlled by a micro-controller, display and key pad 406, to detect and locate fiber any array fault connection. The system 400 has no moving parts, and testing is reliable and fast.

In operation, the multiple light sources 402 are turned on consecutively or selectively. A light from the multiple light sources 402 is coupled to one of the fibers in the fiber array 408, one of the light detector arrays 404 is configured to detect the transmitted light. If an appointed one of the light detector arrays 404 fails to detect the transmitted light from the designated fiber in the fiber array 408 or any other of the light detector arrays 404 detects the transmitted light from the designated fiber in the fiber array 408, the connection in the fiber array 408 is false. In other words, when one of the multiple light sources 402 is turned on, only a designated one of the light detectors 404 senses the light, unless otherwise designed to have more than one of the light detectors 404 sense the light.

Figure 5:
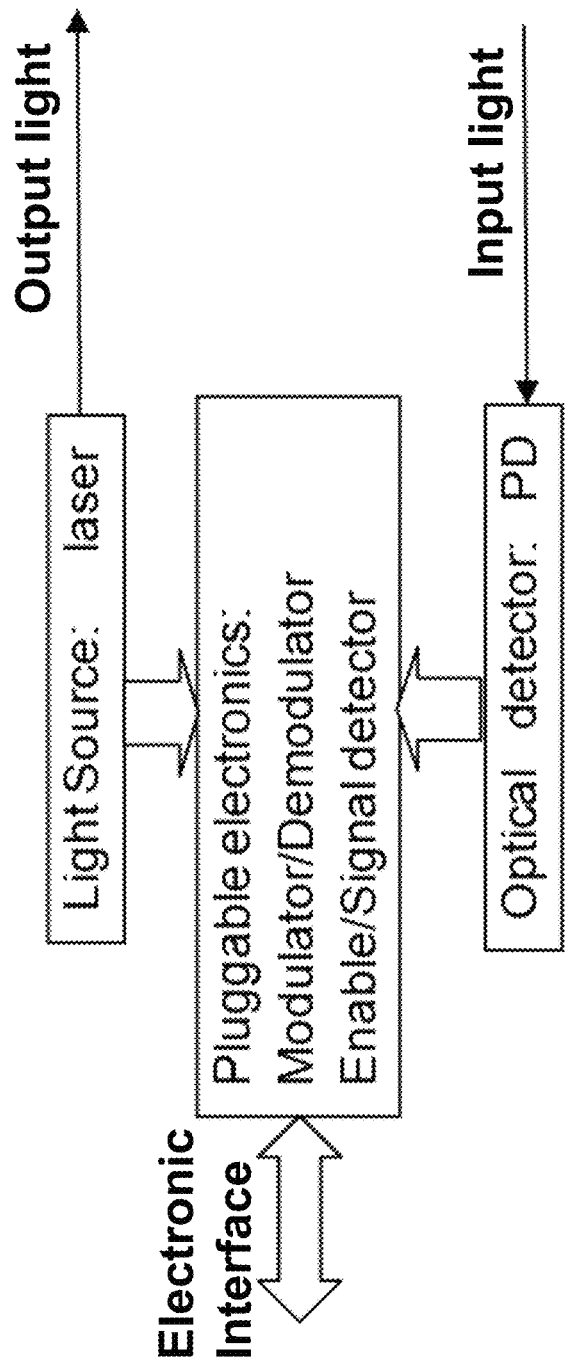
FIG. 5 shows an illustration that is of low cost and facilitated by commoditization and standardization (as pluggable optical transceiver)
Figure 6:
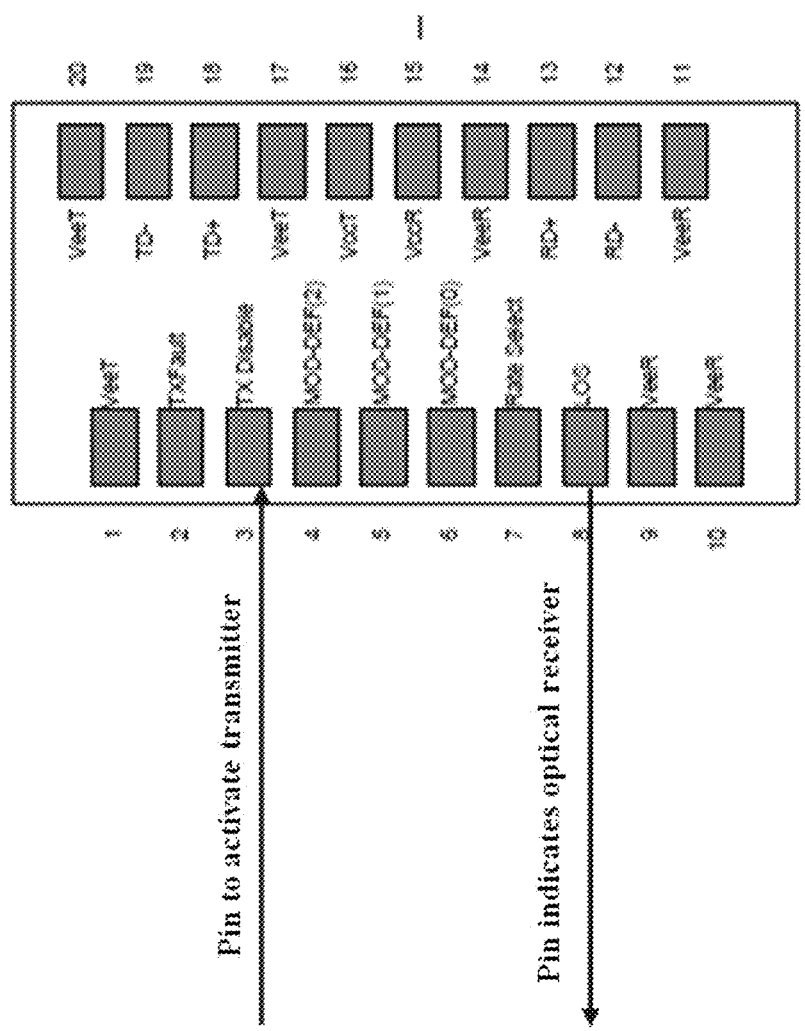
FIG. 6 shows an exemplary SFP transceiver interface.
Figure 7:
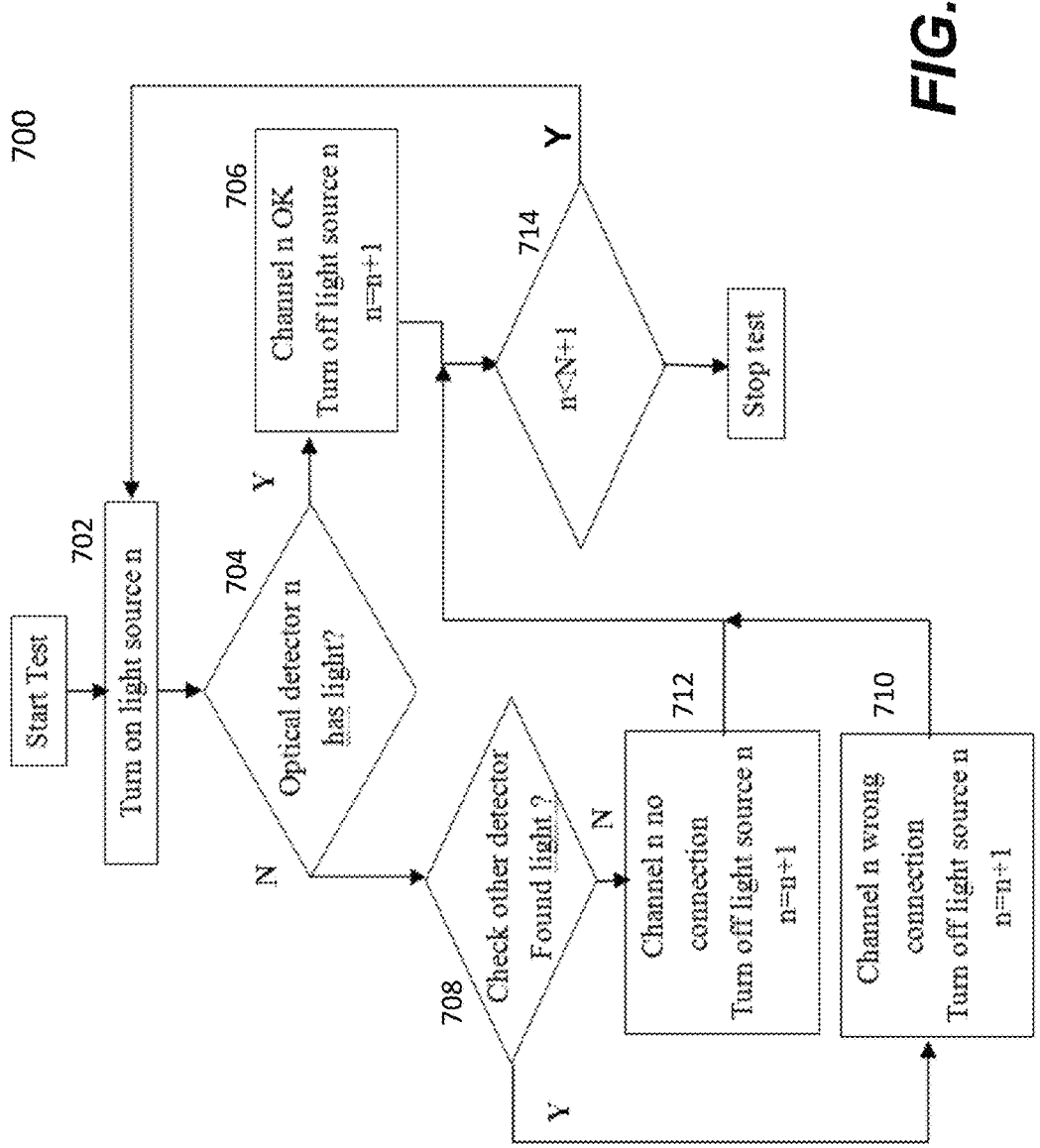
FIG. 7 shows a flowchart or process that can be implemented in a microcontroller to carry out a polarity test process

According to one embodiment, the already developed optical transceivers are used due to its low cost nature. FIG. 5 shows an illustration that is of low cost and facilitated by commoditization and standardization. As shown in FIG. 5, a typical optical fiber transceiver is used. Most of current optical fiber transceivers are pluggable in both optical and electrical domains, making their replacements easy. There are various form factors for pluggable fiber optic transceivers. The most popular one is known as the Small Form-factor Pluggable or SFP. Others such as XFP, QSFP, CFP & CFP2 exist for various applications and are being broadly deployed in Telecom and Datacom applications. The main advantages of a pluggable fiber optic transceiver are:

a. Low-cost now (some can be as low as <$15 USD)
b. Light source, photo-detector (PD), and fiber connector adapter integrated
c. Pluggable in paired form of one light source and one PD in case one channel needs to be replaced, unlike an optical 1×N switch that cannot replace any port easily
d. MM/SM fiber interfaced shared, unlike an optical switch that has to be either SM or MM, but both These fiber optical transceivers usually have an activating pin (TX Disable) for controlling the transmitter and a receiver signal indicator (LOS) for checking the received signal level. FIG. 6 shows an exemplary SFP transceiver interface, where SFP stands for Small Form-factor Pluggable. There is no need to modulate the laser and demodulate the signal of receiver in the polarity test application. The polarity test process is carried out in the microcontroller configured to perform a process 700 as shown in FIG. 7.

In one embodiment, the process 700 is implemented as a software module. Each port has one of three testing results: correct connection, no connection, or wrong connection. The micro-controller only activates one light source each time at 702, injecting the light to one channel of the fiber array input to look for any output from the fiber at 704. If the corresponding output has a detected light, this port is marked at 706 as OK and continue to test a next channel. If no light is found at the output, then the process 700 starts to search all other outputs at 708. If one of them has light (but in a wrong output port) at 710, this port is marked as wrong connection. If, however, there still has no light being found after scanning through the entire output port array at 712, then this input port or channel is marketed as no connection or broken.

The light source/optical detector array may also be individual laser diode and photo detector, or array laser diode (such as VCSEL arrays) and photo detector with fiber array interface, even though such a solution may be more costly to build In summary, a simple yet novel fiber array testing system concept based on a well developed commodity technology is disclosed. The instant invention can determine the correct connection between input and output ports of a fiber array, without using expensive optical switches. Most of the determinations are done in electronic domains and light signals from the transceiver's light source and PD's are being utilized to do checking in optical domain while scanning electronics in micro controllers do all the polarity determination based on programming. Multiple optical transceivers are used as array optical light sources and detectors, there is no need to modulate the optical signals, and the received optical signal from output of fiber array is detected by the receiver circuit directly.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

What we claim is:

1. An optical testing device comprising a microcontroller and a plurality of pluggable transceivers, wherein:
   each pluggable transceiver of the plurality of pluggable transceivers are pluggable in an optical domain to a channel of an optical fiber array;
   each pluggable transceiver of the plurality of pluggable transceivers are pluggable in an electrical domain to an electronic interface of the microcontroller;
   each pluggable transceiver of the plurality of pluggable transceivers comprises a light source and a photodetector configured to be optically paired with one another over a designated channel of the optical fiber array; and
   the microcontroller executes logic to
      designate a channel of the optical fiber array to test using a chosen pluggable transceiver of the plurality of pluggable transceivers,
      control the chosen pluggable transceiver of the plurality of pluggable transceivers to activate the light source of the chosen pluggable transceiver to transmit a light signal over the designated channel of the optical fiber array,
      control the chosen pluggable transceiver of the plurality of pluggable transceivers to activate the photodetector of the chosen pluggable transceiver,
      automatically determine whether the photodetector of the chosen pluggable transceiver is detecting the light signal transmitted by the light source of the chosen pluggable transceiver, and
      mark the designated channel of the fiber array as (i) a correct connection if the photodetector that detects the light signal transmitted by the light source of the chosen pluggable transceiver is the photodetector of the chosen pluggable transceiver, (ii) an incorrect connection if the photodetector that detects the light signal transmitted by the light source of the chosen pluggable transceiver is not the photodetector of the chosen pluggable transceiver, and (iii) no connection if no photodetector of the plurality of pluggable transceivers detects the light signal transmitted by the light source of the chosen pluggable transceiver.

2. The optical testing device as recited in claim 1, wherein the light source of each pluggable transceiver is a laser.

3. The optical testing device as recited in claim 1, wherein each pluggable transceiver of the plurality of pluggable transceivers is a Small Form-factor Pluggable.

4. The optical testing device as recited in claim 3, wherein the light signal of the light source of each pluggable transceiver of the plurality of pluggable transceivers is un-modulated.

5. The optical testing device as recited in claim 3, wherein each pluggable transceiver of the plurality of pluggable transceivers is applicable to both single mode (SM) and multi-mode (MM) fiber arrays.

6. The optical testing device as recited in claim 1, wherein each of the pluggable transceivers is one of SFP, QSFP, QSFP+, XFP, XSP+, CFP, and CFP2.

7. The optical testing device of claim 1, wherein the microcontroller is configured to consecutively control the light source of each pluggable transceiver to test each channel of the fiber array.

8. The optical testing device of claim 1, wherein the microcontroller is configured to selectively control the light source of each pluggable transceiver to test any channel of the fiber array.

9. The optical testing device of claim 1, wherein each pluggable transceiver of the plurality of pluggable transceivers is separately replaceable.

10. The optical testing device as recited in claim 1, wherein, if an incorrect connection is found and a photodetector that detects the light transmitted by the light source of the chosen pluggable transceiver is not the photodetector of the chosen pluggable transceiver, the microcontroller is configured to mark the incorrect photodetector.

11. An optical fiber testing assembly comprising:
   an optical fiber array;
   a microcontroller;
   a display; and
   a plurality of pluggable transceivers, wherein
   the display, and the plurality of pluggable transceivers are communicatively coupled to the microcontroller,
   each pluggable transceiver of the plurality of pluggable transceivers are pluggable in an optical domain to a channel of the optical fiber array,
   each pluggable transceiver of the plurality of pluggable transceivers are pluggable in an electrical domain to an electronic interface of the microcontroller,
   each pluggable transceiver of the plurality of pluggable transceivers comprises a light source and a photodetector optically paired with one another over a designated channel of the optical fiber array, and
   the microcontroller executes logic to
      designate a channel of the optical fiber array to test using a chosen pluggable transceiver of the plurality of pluggable transceivers,
      control the chosen pluggable transceiver of the plurality of pluggable transceivers to activate the light source of the chosen pluggable transceiver to transmit an un-modulated light signal over the designated channel of the optical fiber array,
      control the chosen pluggable transceiver of the plurality of pluggable transceivers to activate the photodetector of the chosen pluggable transceiver,
      automatically determine whether the photodetector of the chosen pluggable transceiver is detecting the un-modulated light signal transmitted by the light source of the chosen pluggable transceiver,
      if the photodetector of the chosen pluggable transceiver is not detecting the un-modulated light signal transmitted by the light source of the chosen pluggable transceiver, control the plurality of pluggable transceivers to activate the photodetectors of the plurality of pluggable transceivers and automatically determine from the plurality of pluggable transceivers which photodetector of the plurality of pluggable transceivers is detecting the un-modulated light signal transmitted by the light source of the chosen pluggable transceiver,
      automatically mark the designated channel of the fiber array as (i) a correct connection if the photodetector that detects the un-modulated light signal transmitted by the light source of the chosen pluggable transceiver is the photodetector of the chosen pluggable transceiver, (ii) an incorrect connection if the photodetector that detects the un-modulated light signal transmitted by the light source of the chosen pluggable transceiver is not the photodetector of the chosen pluggable transceiver, and (iii) no connection if no photodetector of the plurality of pluggable transceivers detects the un-modulated light signal transmitted by the light source of the chosen pluggable transceiver, display with the display whether the designated channel has a correct connection, an incorrect connection, or no connection, and control the chosen pluggable transceiver of the plurality of pluggable transceivers to deactivate the light source of the chosen pluggable transceiver upon determining that the designated channel has a correct connection, an incorrect connection, or no connection.

* * * * *